United States Patent
Sreedharan et al.

(10) Patent No.: US 9,817,653 B2
(45) Date of Patent: Nov. 14, 2017

(54) UPDATING EXTENSION IN RESPONSE TO OPENING ASSOCIATED DOCUMENT

(71) Applicant: SAP SE, Walldorf (DE)

(72) Inventors: Unmesh Sreedharan, Kottayam (IN); Arpitha A Shetty, Dakshina Kannada (IN); Sukesh Kaul, Ghaziabad (IN); Tanushree Nandy, New Delhi (IN); Rakesh Kelappan, Kalpetta (IN); Rahul Tiwari, Allahabad (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/971,541

(22) Filed: Dec. 16, 2015

(65) Prior Publication Data

US 2017/0177320 A1 Jun. 22, 2017

(51) Int. Cl.
*G06F 9/445* (2006.01)
*H04L 29/08* (2006.01)

(52) U.S. Cl.
CPC ............. *G06F 8/65* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 6,718,549 B1 * | 4/2004 | Narin | G06F 8/65 709/203 |
| 2009/0119062 A1 * | 5/2009 | Owens | G06Q 10/10 702/176 |
| 2009/0138869 A1 * | 5/2009 | Fitzgerald | G06F 8/60 717/172 |
| 2009/0279549 A1 * | 11/2009 | Ramanathan | G06F 8/65 370/395.4 |
| 2009/0292734 A1 * | 11/2009 | Miloushev | G06F 11/1076 |
| 2013/0104118 A1 * | 4/2013 | Somani | G06F 8/61 717/173 |
| 2014/0033193 A1 * | 1/2014 | Palaniappan | G06F 8/65 717/173 |
| 2014/0304246 A1 * | 10/2014 | Helmich | G06F 9/546 707/704 |
| 2014/0325470 A1 * | 10/2014 | Padmavilasom | H04L 67/2823 717/100 |
| 2014/0344803 A1 * | 11/2014 | Wang | G06F 8/61 717/178 |
| 2015/0339113 A1 * | 11/2015 | Dorman | H04L 63/123 717/169 |
| 2016/0092205 A1 * | 3/2016 | Seovic | G06F 8/68 717/170 |
| 2016/0379426 A1 * | 12/2016 | Tholen | G07C 9/00015 340/5.21 |

* cited by examiner

*Primary Examiner* — Daxin Wu

(74) *Attorney, Agent, or Firm* — Brake Hughes Bellermann LLP

(57) ABSTRACT

A non-transitory computer-readable storage medium may comprise instructions stored thereon. When executed by at least one processor, the instructions may be configured to cause a backend server to at least receive, from an administrator webserver, an extension, store the extension and an associated timestamp in a repository, the associated timestamp indicating a time at which the extension was received from the administrator webserver, receive a request for the extension from a customer webserver, the request for the extension identifying the extension, and in response to receiving the request for the extension, fetch the extension from the repository, and send the extension to the customer webserver.

15 Claims, 8 Drawing Sheets

UPDATING EXTENSION IN RESPONSE TO OPENING ASSOCIATED DOCUMENT

TECHNICAL FIELD

This description relates to updating extensions for opening and processing documents.

BACKGROUND

Extensions may modify the performance of an application. New extensions may be made available at times that are not convenient for a server to install the extensions.

SUMMARY

According to one example, a non-transitory computer-readable storage medium may comprise instructions stored thereon. When executed by at least one processor, the instructions may be configured to cause a backend server to at least receive, from an administrator webserver, an extension, store the extension and an associated timestamp in a repository, the associated timestamp indicating a time at which the extension was received from the administrator webserver, receive a request for the extension from a customer webserver, the request for the extension identifying the extension, and in response to receiving the request for the extension, fetch the extension from the repository, and send the extension to the customer webserver.

According to another example, a non-transitory computer-readable storage medium may comprise instructions stored thereon. When executed by at least one processor, the instructions may be configured to cause a customer webserver to at least receive a request to open a document, the document identifying an extension, determine a most recent time at which the extension was updated on the customer webserver, and send an extension update request to a backend server, the extension update request identifying the extension and including the most recent time at which the extension was updated on the customer webserver.

According to another example, a method may include receiving, by a backend server from an administrator webserver, an extension, storing the extension and an associated timestamp in a repository, the associated timestamp indicating a time at which the extension was received by the backend server from the administrator webserver, receiving, by a customer webserver, a request to open a document, the document identifying the extension, determining, by the customer webserver, a most recent time at which the extension was updated on the customer webserver, sending an extension update request from the customer webserver to the backend server, the extension update request identifying the extension and including the most recent time at which the extension was updated on the customer webserver, determining, by the backend server, that the most recent time at which the extension was updated on the customer webserver is earlier than the timestamp associated with the extension stored in the repository, and based on determining that the most recent time at which the extension was updated on the customer webserver is earlier than the timestamp associated with the extension stored in the repository, fetching, by the backend server, the extension from the repository, and sending the extension from the backend server to the customer webserver.

The details of one or more implementations are set forth in the accompanying drawings and the description below. Other features will be apparent from the description and drawings, and from the claims.

DETAILED DESCRIPTION

Figure 1:
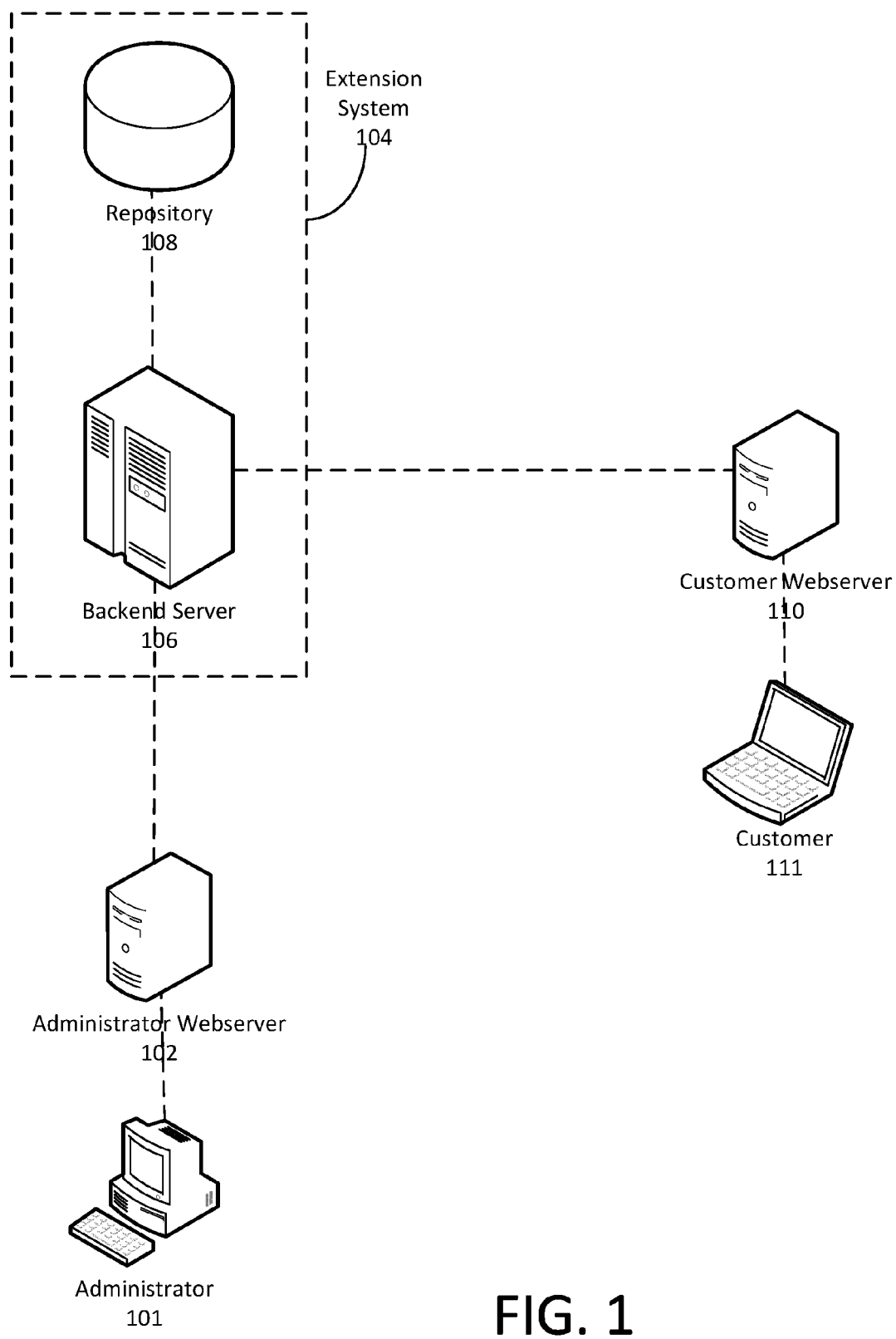
FIG. 1 shows a system for updating extensions according to an example implementation.

FIG. 1 shows a system for updating extensions any computer, such as a laptop or desktop computer, into which a user such as the administrative personnel provides input. An administrator 101, which may be a computer used by administrative personnel of the system, may upload an extension file to an administrator web server 102. The extension file and/or extension may be a plugin to an application that interprets and outputs data included in a document. Extensions may enhance features of the applications, such as enhancing visualization of data included in documents, such as creating visualization charts or allowing documents with different formats to be opened. The administrator 101 may include any computer, such as a laptop or desktop computer, into which a user such as the administrative personnel provides input. The administrator 101 may upload extensions based on new, more recent, and/or better versions of the extensions becoming available. The extension file may be compressed and/or included in a zip file.

The administrator 101 may send the extension file to a backend server 106 via an administrator webserver 102. The administrator webserver 102 may be a server that handles updates to the system provided by the administrative personnel. The administrative webserver 102 may authenticate and log administrative personnel in, and facilitate the administrative personnel providing updates and/or modifications to the backend server 106. The administrator 101 may upload the extension file to the administrator webserver 102. The administrator webserver 102 may respond to receiving the extension file from the administrator 102 by sending the extension file to the backend server 106. The administrator webserver 102 may compress and/or zip the extension file before sending the extension file to the backend server 106, and may send the compressed and/or zipped file to the backend server 106.

The backend server 106 may provide support and updates to customer webservers 110. The backend server 106 may be included in an extension system 104, which also includes a repository 108 for storing the extensions, updates to extensions, and associated metadata. The extension system 104 may store the extensions and respond to extension requests from customer webservers. The backend webserver 106 may handle modifications and/or updates received from the administrative webserver 102, and may receive extensions and/or extension files uploaded to the backend server 106 by the administrator server 102. While one backend server 106 is shown in FIG. 1, multiple backend servers may be included as a cluster in the extension system 104, and the cluster of backend servers may share the repository 108.

The backend server 106 may store and/or upload the extensions, and associated metadata such as timestamps associated with each extension, in a repository 108. In an example in which the administrator webserver 102 compressed and/or zipped the extension file, the backend server 106 may decompress the extension file and/or extract the extension from the zip file. The timestamps may indicate times at which the backend server 106 received the extensions from the administrator webserver 102, and/or times at which the administrator webserver 102 uploaded the extensions to the backend server 106. When the backend server 106 receives a more recent version of an extension, the more recent version of the extension may replace the previous version of the extension, deleting the previous version of the extension and storing the more recent version of the extension.

The repository 108 may store data on behalf of the backend server 106. The repository 108 may also store the extensions, which the repository 108 received form the backend server 106, and associated metadata such as timestamps. The repository 108 may transmit data, such as the stored extensions and associated metadata, to the backend server 106 upon request by the backend server 106.

The customer webserver 110 may provide software as a service, such as by running web applications, to users of customer computers 111 (while FIG. 1 shows a single customer computer 111, the customer webserver 110 may server multiple customer computers). The customer computer 111 may include any computer, such as a laptop or desktop computer, into which a user such as a customer provides input and receives output based on processes performed by the customer webserver 110. The customer webserver 110 may, for example, run data visualization applications upon request by users of the customer computers 111.

The customer webserver 110 may open documents upon request by the user of the customer computer 111. The request by the user of the customer computer 111 may take the form of an instruction, such as a textual command in a command-line interface, or clicking on an icon associated with the document in a graphical user interface. The customer webserver 110 may open the documents using software applications, software applications running extensions, and/or extensions. The document may be associated with an application that uses the extension, or the document may rely directly on the extension to open the document. The customer webserver 110 may receive the extensions from the backend server 106.

When the customer webserver 110 receives a request from the customer computer 111 to open a document, the customer webserver 110 may request a most recent version of a extension associated with the document from the backend server, or may determine whether an extension associated with the document is available, and/or a more recent extension is available than the customer webserver 110 has already installed. In one example, the customer webserver 110 may determine if a more recent extension is available by sending a query to the backend server 106, with the query identifying the extension and indicating a most recent version of the extension installed by the customer webserver 110 and/or a most recent time at which the customer webserver 110 installed the extension. In this example, the backend server 106 may determine whether a more recent version of the extension is available by querying the repository 108 for a timestamp associated with the extension, and comparing the timestamp to the most recent time indicated by the query received from the customer webserver 110.

In another example, the customer webserver 110 may determine whether a more recent version of the extension is available by sending a query to the backend server 106, with the query identifying the extension and requesting the backend server 106 to send the timestamp, indicating the time at which the most recent version of the extension was received, to the customer webserver 110. In this example, the backend server 106 may respond to the query by retrieving the timestamp from the repository 108 and sending the timestamp to the customer webserver 110. The customer webserver 110 may then compare the timestamp received from the backend server 106 to a time at which a most recent version of the extension was received by the customer webserver 110. If the time included in the timestamp is later and/or more recent than the time at which a most recent version of the extension was received by the customer webserver 110, then the customer webserver 110 may determine that a more recent version of the extension is available. If the customer webserver 110 determines that a more recent version of the extension is available, then the customer webserver 110 may send a request for the extension to the backend server 106.

If the backend server 106 determines that a more recent version of the extension is available, and/or the backend server 106 receives a request for the extension from the customer webserver 110, then the backend server 106 may retrieve the extension from the repository 108, such as by sending a request or fetch instruction to the repository 108 and subsequently receiving the extension from the repository 108, and may send the extension to the customer webserver 110. After receiving the most recent version of the extension from the backend server 106, the customer webserver 110 may install the most recent version of the extension. After installing the most recent version of the extension, the customer webserver 110 may open the document using the installed extension and/or using an application that uses the installed extension.

In an example implementation, the backend server 106 may serve multiple customer webservers. When the backend server 106 receives an extension and/or an updated extension from the administrator webserver 102 (or another administrator webserver in an example of multiple administrator webservers), rather than push the extension and/or updated extension to the multiple customer webservers, the backend server 106 may wait for the customer webservers to request the extensions and/or updated extensions from the backend server 106. The backend server 106 may respond to the requests from each of the customer webservers individually, and send the extension and/or updated extension to the individual webservers on-demand and/or as needed or requested by the customer webservers.

By sending the extension and/or updated extension to the individual customer webservers as needed, rather than every time the backend server 106 receives an updated extension from the administrator webserver 102, the backend server 106 may reduce network traffic and server processing by reducing the number of updating extensions sent from the backend server 106 to customer webservers. Sending only the most recent and/or newest version of the extensions from the backend server 106 to the customer webservers may reduce network traffic and/or processing by the backend server 106 and customer webservers. Sending the extension and/or updated extension to the individual customer webservers only as needed may also obviate the need to restart the customer webservers to install the updated extensions, avoiding a denial or interruption of service to users currently logged in and interacting with applications running on the customer webservers when the customer webservers are restarted.

Figure 2A:
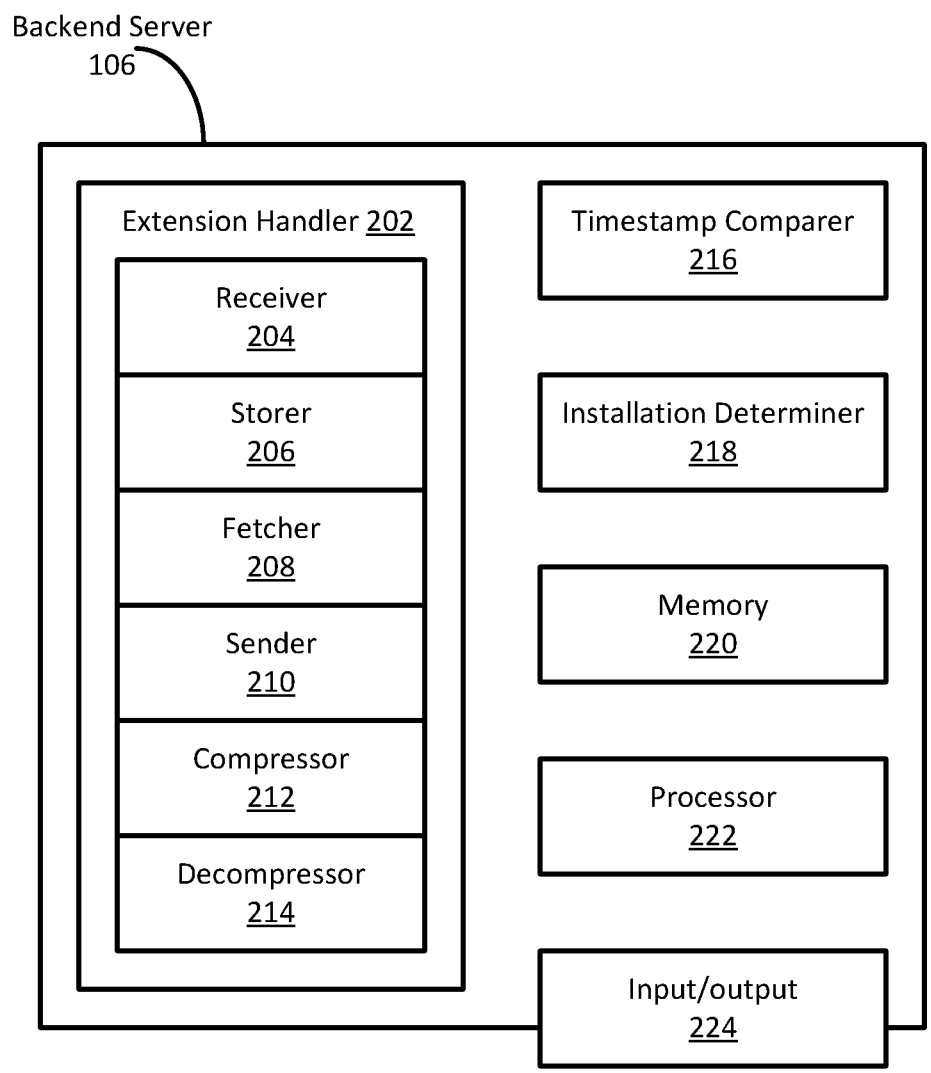
FIG. 2A shows a backend server included in the system for updating extensions according to an example implementation.

FIG. 2A shows the backend server 106 included in the system for updating extensions according to an example implementation. The backend server 106 may store extensions in the repository 108 (not shown in FIG. 2A), and may respond to requests from the customer webserver 110 (not shown in FIG. 2A) to update extensions.

The backend server 106 may include an extension handler 202. The extension handler 202 may receive extensions and/or updated extensions from the administrator webserver 102 (not shown in FIG. 2), store the extensions and/or updated extensions in the repository 108, and/or send the extensions and/or updated extensions to the customer webserver 110.

The extension handler 202 may include a receiver 204. The receiver 204 may receive, handle, and/or process the extensions received by the backend server 106 from the administrator webserver 102. The receiver 204 may, for example, examine and/or parse the received extensions to determine a document type and/or application associated with each received extension. The receiver 204 may also determine a timestamp associated with the received extensions, which may be based on a time that the administrator webserver 102 sent the extension to the backend server 106 or based on a time that the backend server 106 received the extension from the administrator webserver 102.

The extension handler 202 may include a storer 206. The storer 206 may store the extensions, and any associated metadata, in the repository 108. The associated metadata may include the timestamp, and an identifier of the extension (which may be considered an extension ID) and/or type of document or application which uses the extension.

The extension handler 202 may include a fetcher 208. The fetcher 208 may fetch and/or retrieve extensions from the repository 108 in response to requests from the customer webserver 110 for the extensions and/or based on determinations that more recent versions of the extensions are available and/or stored in the repository 108.

The extension handler 202 may include a sender 210. The sender 210 may send the extensions to the customer webserver 110 upon request from the customer webserver 110 and/or based on determinations that more recent versions of the extensions are available and/or stored in the repository 108.

The extension handler 202 may include a compressor 212. The compressor 212 may compress the extension files before the storer 206 stores the extension files in the repository 108.

The extension handler 202 may include a decompressor 214. The decompressor 214 may decompress and/or extract compressed or zipped extension files received from the administrator webserver 102 before the storer 206 stores the extension files in the repository 108. The decompressor 214 may decompress compressed files that the fetcher 208 retrieves from the repository 108.

The backend server 106 may include a timestamp comparer 216. The timestamp comparer 216 may compare timestamps of extensions stored in the repository 108 to most recent times at which extensions were installed in the customer webserver 110, and/or a time stored by the customer webserver 110 in association with the extension. If the timestamp is the same, then no update to the customer webserver 110 may be needed. If the timestamp stored in the repository 108 is more recent, then the backend server 106 may determine that the backend server 106 should send an extension update and/or most recent extension to the customer webserver 110.

The backend server 106 may include an installation determiner 218. The installation determiner 218 may determine whether any version of an extension has been installed on a particular customer webserver 110. If a version of the extension has been installed on the customer webserver 110, then the timestamp comparer 216 may determine whether a more recent version of the extension should be installed on the customer webserver 110. If no version of the extension has been installed on the backend server 106, then the backend server 106 may not need to compare the timestamp, and the backend server 106 may determine that the extension should be installed on the customer webserver 110.

The backend server 106 may include a memory 220. The memory 220 may include at least one non-transitory computer-readable storage medium, such as a storage device. The memory 220 may include instructions. The instructions, when executed by at least one processor, may be configured to cause the backend server 106 to perform any combination of the methods, functions, and/or processes described herein. The memory 220 may also include data. The data may include data generated as a result of performing any of the methods, functions, and/or processes described herein, and/or used to perform any of the methods, functions, and/or processes described herein.

The backend server 106 may include at least one processor 222. The at least one processor 222 may execute instructions, such as instructions stored in memory 220, to cause the backend server 106 to perform any combination of the methods, functions, and/or techniques described herein.

The backend server 106 may also include an input/output module 224. The input/output module 224 may include one or more input interfaces and one or more output interfaces. The input interfaces and output interfaces may include wired or wireless nodes for communicating with other computing systems, such as the administrator webserver 102, repository 108, and customer webserver 110. The input interface(s) may also include a keyboard, mouse, touchscreen, and/or microphone, as non-limiting examples. The output interface(s) may include a display and/or speaker, as non-limiting examples.

Figure 2B:
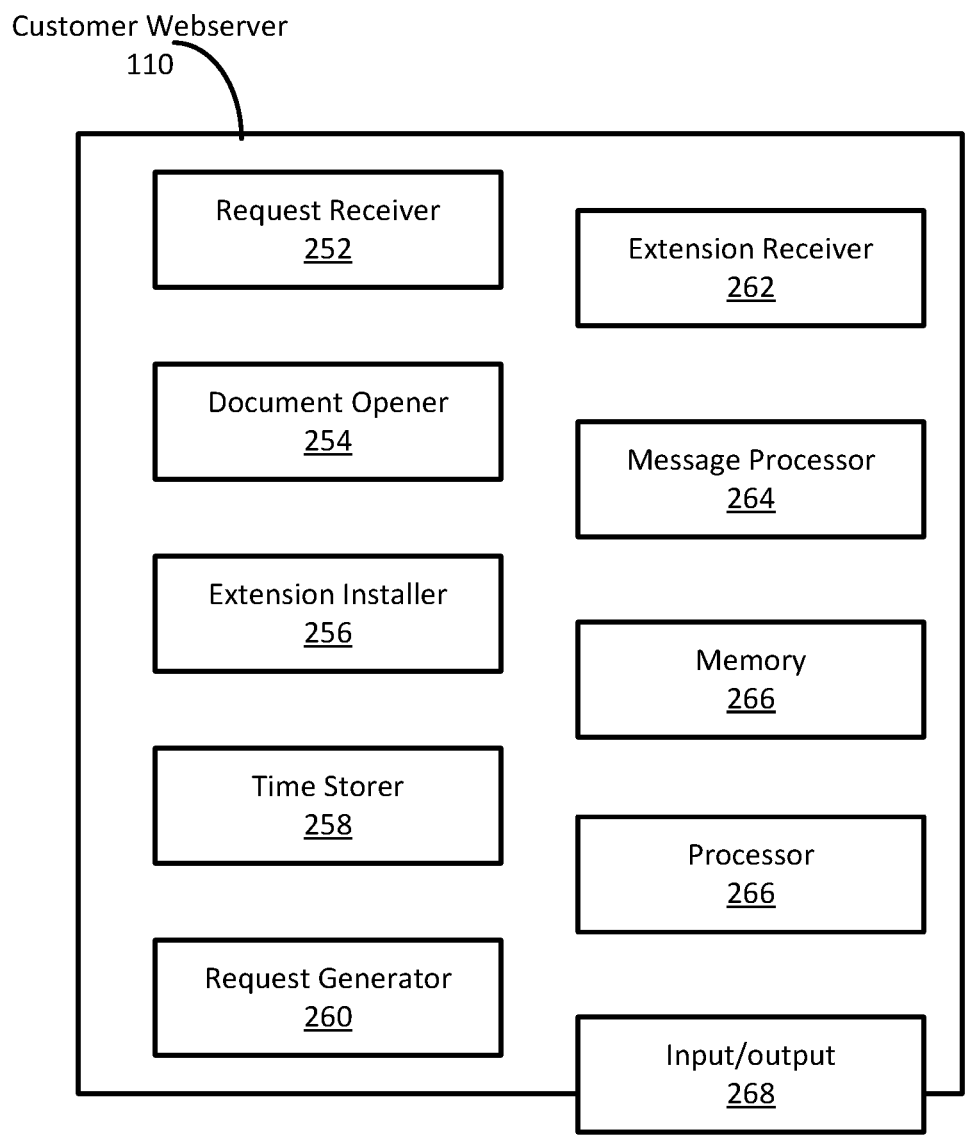
FIG. 2B is a diagram of a customer webserver included in the system for updating extensions according to an example implementation.

FIG. 2B is a diagram of a customer webserver 110 included in the system for updating extensions according to an example implementation. Customer webserver 110 may respond to requests from the customer computer 111 to open documents by requesting the backend server 106 to send updated and/or most recent versions of extensions associated with documents, and/or applications used to open the documents, that the customer computer 111 requested to open. The customer computer webserver 110 may also open and process the documents that the customer computer 111 requests to open.

The customer webserver 110 may include a request receiver 252. The request receiver 252 may receive, from the customer computer 111, requests to open documents. The customer computer 111 may have sent a request to open a document to the customer webserver 110 in response to an instruction from a user, such as via a keyboard or mouse, to open the document.

The customer webserver 110 may include a document opener 254. The document opener 254 may open documents in response to the request receiver 252 receiving a request to open the document. The document opener 254 may open and begin processing the document. The document opener 254 may open and/or process the document using any extension installed on the customer webserver 110 which is identified by the document and/or associated with an application used to open the document.

The customer webserver 110 may include an extension installer 256. The extension installer 256 may install extensions on the customer webserver 110. The customer webserver 110 may have received the installed extensions from the backend server 106.

The customer webserver 110 may include a time storer 258. The time storer 258 may store times associated with installed extensions. The stored times may be times at which the customer webserver 110 received the extensions, or may be the timestamps stored by the backend server 106 and sent to the customer webserver 110 with the extensions.

The customer webserver 110 may include a request generator 260. The request generator 260 may generate and send requests for extensions to the backend server 106. The request generator 260 may generate and send requests for extensions to the backend server 106 in response to a request to open a document.

The customer webserver 110 may include an extension receiver 262. The extension receiver 262 may receive the extensions from the backend server 106 and pass the extensions to the extension installer 256 for installation on the customer webserver 110.

The customer webserver 110 may include a message processor 264. The message processor 264 may receive and process messages from the backend server 106, such as messages indicating that an extension, and/or a more recent version of an extension, is available or is not available. If an extension or more recent version of an extension is not available, then the request generator 260 may not send a request for the extension to the backend server 106. If an extension or more recent version of an extension is available, then the request generator 260 may send a request for the extension to the backend server 106.

Figure 3:
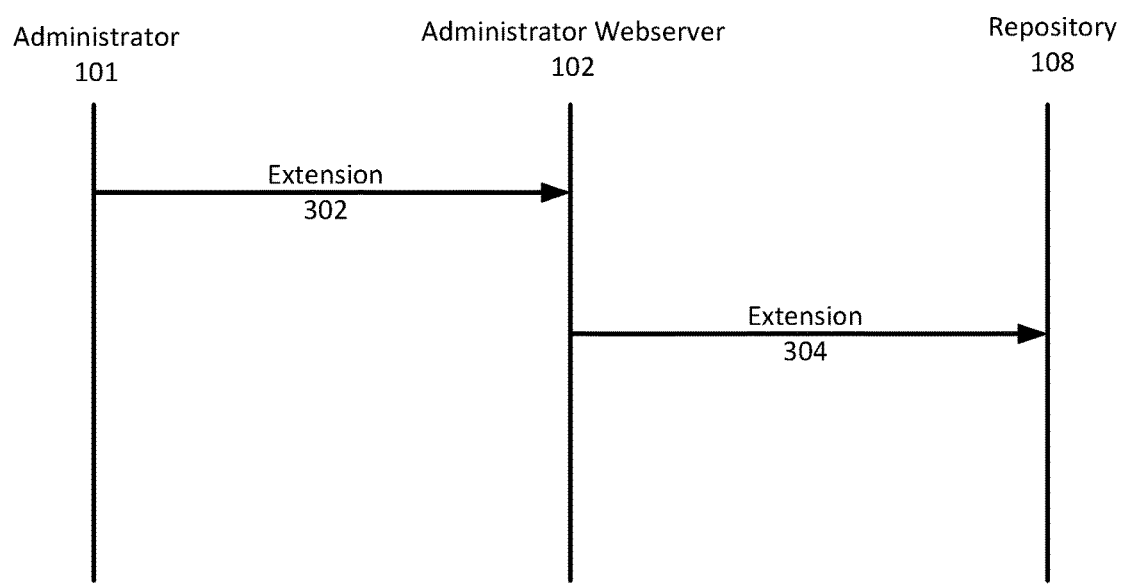
FIG. 3 is a diagram showing an extension upload workflow according to an example implementation.

FIG. 3 is a diagram showing an extension upload workflow according to an example implementation. In this example, the administrator computer 101 may upload the extension (302) to the administrator web server 102. The administrator computer 101 may upload the extension in response to an instruction from a user, who may be an administrator. The extension (302) may include an extension file, and may also include metadata such as an identifier of the extension.

In response to receiving the extension (302), the administrator webserver 102 may upload the extension (304) to the repository 108. The administrator webserver 102 may upload the extension (304) to the repository 108 via the backend server 106 (not shown in FIG. 3). Uploading the extension to the repository 108 may include the backend server 106 extracting the extension from a zip file, saving the extension to the repository 108 as an info object (which may include the extension file and metadata such an identifier of the extension and a timestamp), updating a bundle identifier list (which may identify extensions stored in the repository 108) in the repository 108, and/or updating a timestamp associated with the extension in the repository 108.

Figure 4:
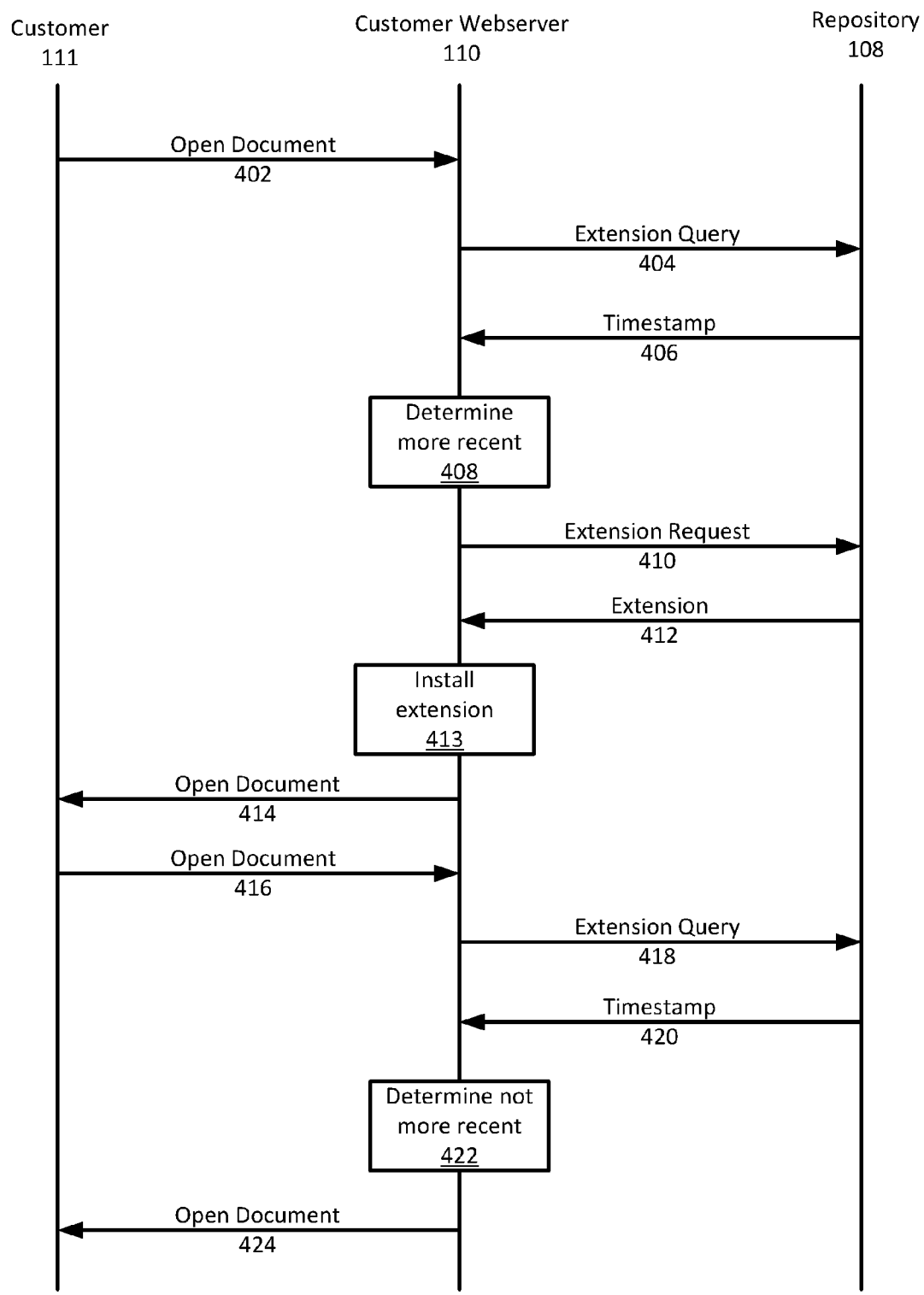
FIG. 4 is a diagram showing an open document workflow according to an example implementation.

FIG. 4 is a diagram showing an open document workflow according to an example implementation. 402-414 show an example in which a more recent extension is available in the repository 108. In this example, a user of a customer computer 111 may request to open a document (402). The user may, for example, type an instruction into the customer computer 111 or click on an icon displayed by the customer computer 111 that is associated with the document.

The customer webserver 110 may respond to the request to open the document (402) by sending an extension query to the backend server 106, which may forward the query (404) to the repository 108. In the example shown and described with respect to FIG. 4, communications between the customer webserver 110 and the repository 108 may be via the backend server 106, such as by sending messages and/or data to the backend server 106 and the backend server 106 forwarding the messages and/or data. In this example, the repository 108 may respond to the query (404) by sending a timestamp (406), which may be included in a bundle ID list, to the customer webserver 110. The customer webserver 110 may determine whether a more recent version of the extension than the version installed on the customer webserver 110 is available (408), such as by comparing the timestamp to a time stored on the customer webserver 110.

If the timestamp is not equal to the timestamp stored in association with the document, or if the timestamp is later than the timestamp associated with the application, and/or if the application has not installed the extension, then the customer web server 110 may determine that a more recent version of the extension is available. Based on determining that the more recent version of the timestamp is available, the customer webserver 110 may send an extension request (410) to the repository. The extension request (410) may include an identifier of the extension. The repository 108 may respond to the extension request (410) by sending the identified extension (412), which may include unzipping and downloading the extension, to the customer webserver 110. The repository 108 may also update the bundle ID list and/or the timestamp associated with the extension to indicate the version of the extension that the repository 108 sent to the customer webserver 110. Upon receiving the extension (412), the customer webserver 110 may install the extension (413) and open the document (414), using the extension, for the user of the customer computer 111 to open and interact with. Opening the document (414) may include returning the document to the workspace.

416-424 show an example in which a more recent version of the extension is not available. In this example, the customer computer 111 may open a document (416) in response to a request or instruction from a user, sending a request to the customer webserver 110. The customer webserver 110 may respond to the request from the customer computer 111 to open the document (416) by determining an extension associated with the document, and sending an extension query (418), which identifies the determined extension, to the repository 108. As discussed above, communication between the customer webserver 110 and the repository 108 may be via the backend server 106.

The repository 108 may respond to the extension query (418) by sending a timestamp (420) to the customer webserver 110. The timestamp (420) may indicate a most recent time at which the extension was updated. The customer webserver 110 may determine that the most recent version of the extension is not more recent than the version installed on the customer webserver 110 (422) by comparing the timestamp (420) to a time stored on the customer webserver 110. Based on determining that the most recent version of the extension is not more recent than the version installed on the customer webserver 110 (422), the customer webserver 110 may open the document (424), for viewing and interaction with the customer computer 111, without installing a new version of the extension.

Figure 5:
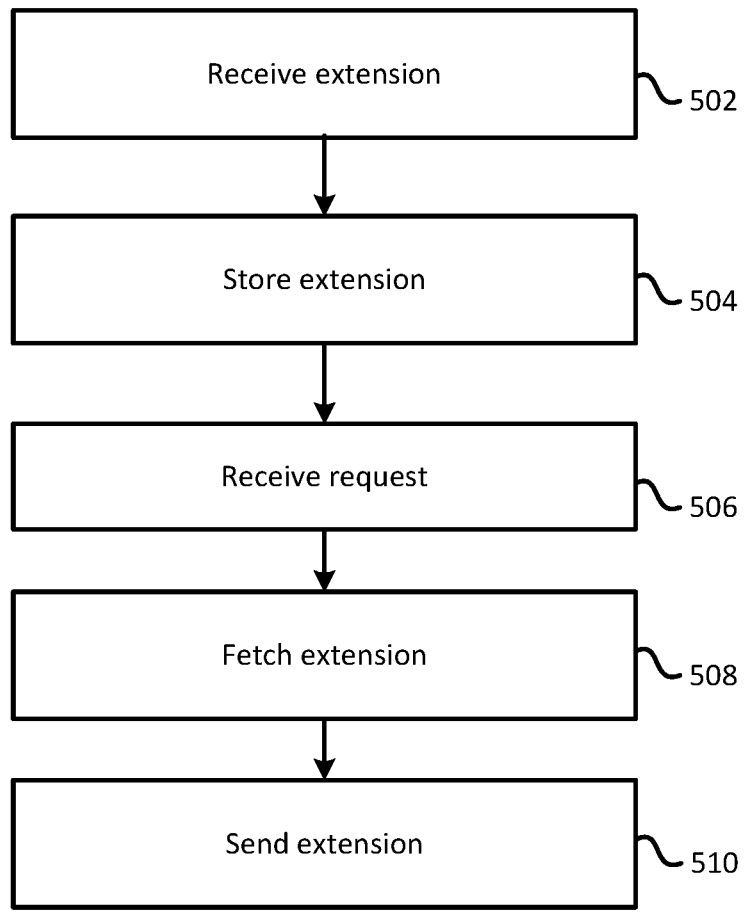
FIG. 5 is a flowchart showing a method according to an example implementation.

FIG. 5 is a flowchart showing a method according to an example implementation. According to this example, the method may include a backend server receiving, from an administrator webserver, an extension (502). The method may also include storing the extension and an associated timestamp in a repository (504). The associated timestamp may indicate a time at which the extension was received from the administrator webserver. The method may also include receiving a request for the extension from a customer webserver (506). The request for the extension may identify the extension. The method may also include fetching the extension from the repository (508) in response to receiving the request for the extension, and sending the extension to the customer webserver (510) in response to receiving the request for the extension.

According to an example implementation, the request for the extension may identify the extension and indicate a most recent time at which the customer webserver updated the extension. In this example, the method may further include the backend server fetching the extension from the repository and sending the extension to the customer webserver, if the most recent time at which the customer webserver updated the extension is earlier than the time indicated by the associated timestamp, and not fetching the extension from the repository and not sending the extension to the customer webserver, if the most recent time at which the customer webserver updated the extension is the same as the time indicated by the associated timestamp.

According to an example implementation, the method may further include the backend server sending a message to the customer webserver indicating that no updated extension is available, if the most recent time at which the customer webserver updated the extension is the same as the time indicated by the associated timestamp.

According to an example implementation, the request for the extension may identify the extension and indicate a most recent time at which the customer webserver updated the extension. In this example, the method may further include the backend server determining whether the customer webserver has installed the extension, fetching the extension from the repository and sending the extension to the customer webserver, if the customer webserver has not installed the extension or the most recent time at which the customer webserver updated the extension is earlier than the time indicated by the associated timestamp, and not fetching the extension from the repository and not sending the extension to the customer webserver, if the customer webserver has installed the extension and the most recent time at which the customer webserver updated the extension is the same as the time indicated by the associated timestamp.

According to an example implementation, the method may further include the backend server, in response to receiving the request for the extension, fetching the extension and the associated timestamp from the repository, and sending the extension and the associated timestamp to the customer webserver.

According to an example implementation, the customer webserver may be a first customer webserver and the request for the extension may be a first request for the extension. In this example, the method may further include the backend server receiving a second request for the extension from a second customer webserver, the second request for the extension identifying the extension and being after the first request for the extension and after sending the extension to the first customer webserver, and, in response to receiving the second request for the extension, fetching the extension from the repository, and sending the extension to the second customer webserver.

According to an example implementation, the storing the extension may include storing the extension and the associated timestamp in the repository without restarting the backend server and without restarting the customer webserver.

According to an example implementation, the storing the extension may include compressing the extension, and storing the compressed extension and the associated timestamp.

According to an example implementation, the method may further include the backend server, in response to receiving the request for the extension, fetching the compressed extension from the repository, decompressing the compressed extension, and sending the decompressed extension to the customer webserver.

According to an example implementation, the extension may enhance visualization of data included in a document to be opened by the customer webserver.

According to an example implementation, the backend server may share the repository with multiple other backend servers.

According to an example implementation, the customer webserver may use the extension to open a document, the document identifying the extension.

According to an example implementation, the sending the extension to the customer webserver may include not sending the extension to any other customer webservers until receiving requests for the extension from the other customer webservers.

Figure 6:
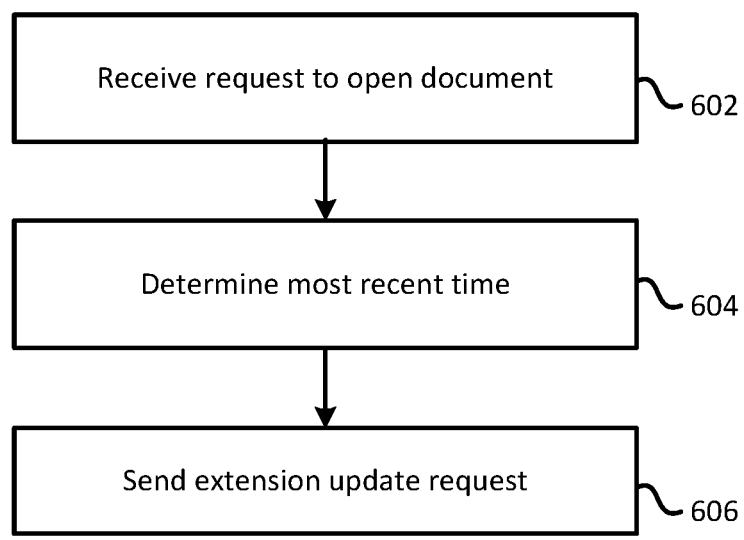
FIG. 6 is a flowchart showing another method according to an example implementation.

FIG. 6 is a flowchart showing another method according to an example implementation. In this example, the method may include a customer webserver receiving a request to open a document (602). The document may identify an extension. The method may also include determining a most recent time at which the extension was updated on the customer webserver (604). The method may also include sending an extension update request to a backend server (606). The extension update request may identify the extension and include the most recent time at which the extension was updated on the customer webserver.

According to an example implementation, the method may further include the customer webserver receiving the extension from the backend server, installing the extension, and opening the document with the installed extension.

According to an example implementation, the method may further include the customer webserver receiving a message from the backend server, the message indicating that a more recent version of the extension is not available.

Figure 7:
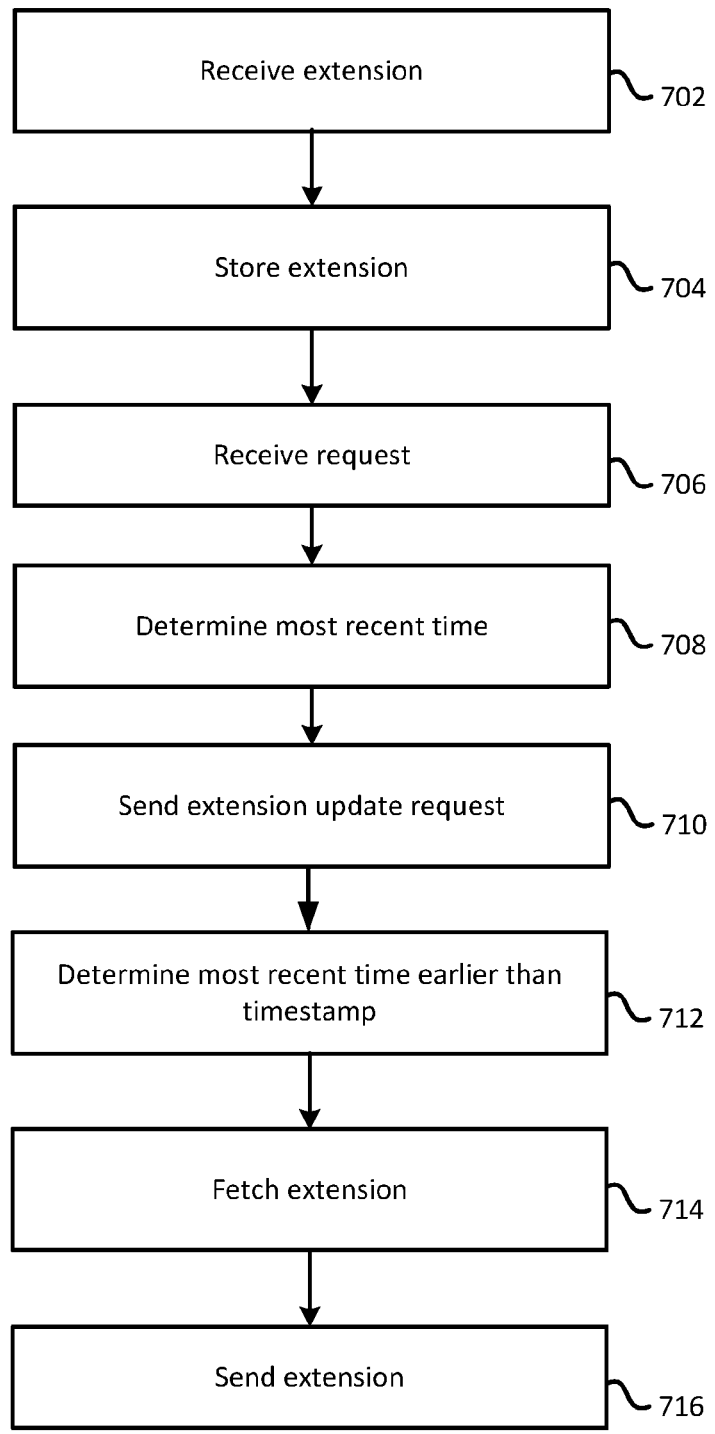
FIG. 7 is a flowchart showing another method according to an example implementation.

FIG. 7 is a flowchart showing another method according to an example implementation. According to this example, the method may include receiving, by a backend server from an administrator webserver, an extension (702). The method may also include storing the extension and an associated timestamp in a repository (704). The associated timestamp may indicate a time at which the extension was received by the backend server from the administrator webserver. The method may also include receiving, by a customer webserver, a request to open a document (706). The document may identify the extension. The method may also include determining, by the customer webserver, a most recent time at which the extension was updated on the customer webserver (708). The method may also include sending an extension update request from the customer webserver to the backend server (710). The extension update request may identify the extension and include the most recent time at which the extension was updated on the customer webserver. The method may also include determining, by the backend server, that the most recent time at which the extension was updated on the customer webserver is earlier than the timestamp associated with the extension stored in the repository (712). The method may also include, based on determining that the most recent time at which the extension was updated on the customer webserver is earlier than the timestamp associated with the extension stored in the repository, fetching, by the backend server, the extension from the repository (714), and sending the extension from the backend server to the customer webserver (716).

According to an example implementation, the storing the extension may include storing the extension and the associated timestamp in the repository without restarting the backend server and without restarting the customer webserver.

According to an example implementation, the backend server storing the extension may include the backend server compressing the extension, and the backend server storing the compressed extension and the associated timestamp in the repository.

According to an example implementation, the method may further include the backend server, in response to receiving the request for the extension, fetching the compressed extension from the repository, decompressing the compressed extension, and sending the decompressed extension to the customer webserver.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a backend server to at least:
  receive, from an administrator webserver, an extension, the extension enhancing a feature of an application, the extension received at the administrator webserver from an administrator computer;
  store the extension and an associated timestamp in a repository, the associated timestamp indicating a time at which the extension was received from the administrator webserver, the backend server configured to not forward the extension to a customer webserver that serves a customer computer unless the backend server first receives an extension update request from the customer webserver;
  receive the extension update request from the customer webserver that serves the customer computer, the extension update request sent by the customer webserver in response to the customer webserver receiving a request, from the customer computer, to open a document associated with the application, the extension update request identifying the extension and indicating a most recent time at which the customer webserver updated the extension;

determine that the customer webserver has not installed the extension based on the most recent time at which the customer webserver updated the extension being earlier than the time indicated by the associated timestamp; and in response to determining that the customer webserver has not installed the extension;
fetch the extension from the repository; and
send the extension to the customer webserver, such that the extension is uploaded to the customer webserver in response to the request to open the document by the customer computer;

wherein the backend server is also associated with other customer webservers, and wherein the sending the extension to the customer webserver includes not sending the extension to at least some of the other customer webservers until receiving requests for the extension from the at least some of the other customer webservers.

2. The non-transitory computer-readable storage medium of claim 1, wherein the instructions are further configured to cause the backend server to:
receive a subsequent request for the extension from the customer webserver;
determine that the customer webserver has installed the extension; and
based on determining that the customer webserver has installed the extension, send a message to the customer webserver indicating that no updated extension is available.

3. The non-transitory computer-readable storage medium of claim 1, wherein the backend server is configured to, in response to determining that the customer webserver has not installed the extension:
fetch the extension and the associated timestamp from the repository; and
send the extension and the associated timestamp to the customer webserver.

4. The non-transitory computer-readable storage medium of claim 1, wherein:
the customer webserver is a first customer webserver and the request for the extension is a first request for the extension; and
the instructions are further configured to cause the backend server to:
receive a second request for the extension from a second customer webserver, the second request for the extension identifying the extension and being after the first request for the extension and after sending the extension to the first customer webserver; and
in response to receiving the second request for the extension:
fetch the extension from the repository; and
send the extension to the second customer web server.

5. The non-transitory computer-readable storage medium of claim 1, wherein the storing the extension includes storing the extension and the associated timestamp in the repository without restarting the backend server and without restarting the customer web server.

6. The non-transitory computer-readable storage medium of claim 1, wherein the storing the extension includes:
compressing the extension; and
storing the compressed extension and the associated timestamp.

7. The non-transitory computer-readable storage medium of claim 6, wherein the instructions are configured to cause the backend server to, in response to receiving the request for the extension:
fetch the compressed extension from the repository;
decompress the compressed extension; and
send the decompressed extension to the customer webserver.

8. The non-transitory computer-readable storage medium of claim 1, wherein the extension enhances visualization of data included in the document to be opened by the application running on the customer webserver.

9. The non-transitory computer-readable storage medium of claim 1, wherein the backend server shares the repository with multiple other backend servers.

10. A non-transitory computer-readable storage medium comprising instructions stored thereon that, when executed by at least one processor, are configured to cause a customer webserver to at least: receive, from a customer computer, a request to open a document, the document associated with an application; determine a most recent time at which an extension for the application was received from a backend server and updated on the customer webserver, the extension enhancing a feature of the application, wherein the backend server received the extension from an administrator webserver, wherein the administrator webserver received the extension from an administrator computer, and wherein the backend server is configured to not forward the extension to the customer webserver unless the backend server first receives an extension update request from the customer webserver; and send the extension update request to the backend server, the extension update request identifying the extension and including the most recent time at which the extension was updated on the customer webserver; wherein the instructions are further configured to cause, when a more recent version of the extension is not available, the customer webserver to receive a message from the backend server, the message indicating that the more recent version of the extension is not available.

11. The non-transitory computer-readable storage medium of claim 10, wherein the instructions are further configured to cause the customer web server to:
receive the extension from the backend server;
install the extension, such that the extension is installed on the customer webserver in response to the request to open the document by the customer computer; and
open the document with the installed extension.

12. A method comprising: receiving, by a backend server from an administrator webserver, an extension, the extension enhancing a feature of an application, the extension received at the administrator webserver from an administrator computer; storing the extension and an associated timestamp in a repository, the associated timestamp indicating a time at which the extension was received by the backend server from the administrator webserver, the backend server configured to not forward the extension to a customer webserver that serves a customer computer unless the backend server first receives an extension update request from the customer webserver; receiving, by the customer webserver from the customer computer, a request to open a document, the document identifying the application; determining, by the customer webserver, a most recent time at which the extension was updated on the customer webserver; sending the extension update request from the customer webserver to the backend server, the extension update request identifying the extension and including the most recent time at which the extension was updated on the customer webserver; determining, by the backend server, that the most recent time at which the extension was updated on the customer webserver is earlier than the timestamp associated with the extension stored in the repository; and based on determining that the most recent time at which the extension was updated on the customer webserver is earlier than the timestamp associated with the extension stored in the repository; fetching, by the backend server, the extension from the repository; and sending the extension from the backend server to the customer webserver, such that the extension is installed on the customer webserver in response to the request to open the document by the customer computer; wherein the instructions are further configured to cause, when a more recent version of the extension is not available, the customer webserver to receive a message from the backend server, the message indicating that the more recent version of the extension is not available; and wherein the backend server is also associated with other customer webservers, and wherein the sending the extension to the customer webserver includes not sending the extension to at least some of the other customer webservers until receiving requests for the extension from the at least some of the other customer webservers.

13. The method of claim 12, wherein the storing the extension includes storing the extension and the associated timestamp in the repository without restarting the backend server and without restarting the customer webserver.

14. The method of claim 12, wherein the backend server storing the extension includes:
  the backend server compressing the extension; and
  the backend server storing the compressed extension and the associated timestamp in the repository.

15. The method of claim 14, wherein the method further includes the backend server, in response to receiving the request for the extension:
  fetching the compressed extension from the repository;
  decompressing the compressed extension; and
  sending the decompressed extension to the customer webserver.

\* \* \* \* \*